United States Patent
Williams et al.

(10) Patent No.: US 7,571,960 B2
(45) Date of Patent: Aug. 11, 2009

(54) HAND GRIP FOR A SEAT ASSEMBLY

(75) Inventors: Brian E. Williams, Ida, MI (US); William F. Lohness, Jonesville, MI (US)

(73) Assignee: Michigan Tube Swagers & Fabricators, Inc., Temperance, MI (US)

( * ) Notice: Subject to any disclaimer, the term of this patent is extended or adjusted under 35 U.S.C. 154(b) by 0 days.

(21) Appl. No.: 12/050,485

(22) Filed: Mar. 18, 2008

(65) Prior Publication Data

US 2008/0157570 A1   Jul. 3, 2008

Related U.S. Application Data

(62) Division of application No. 11/118,992, filed on Apr. 29, 2005.

(60) Provisional application No. 60/566,490, filed on Apr. 29, 2004.

(51) Int. Cl.
    *A47C 31/00* (2006.01)
(52) U.S. Cl. ................................. 297/183.7
(58) Field of Classification Search ............ 297/452.18, 297/183.7, 183.8, 183.6, 183.9, 183.5, 183.1; 16/110.1, 111.1, 412, 430, 422, DIG. 24; 403/337, 335; 24/296, 293
    See application file for complete search history.

(56) References Cited

U.S. PATENT DOCUMENTS

| | | | |
|---|---|---|---|
| 1,304,700 A * | 5/1919 | Otte ............................ | 16/412 |
| 2,604,929 A | 7/1952 | Foley | |
| 2,793,386 A * | 5/1957 | Muhlhauser ................. | 16/416 |
| 3,021,175 A * | 2/1962 | Norquist ...................... | 297/58 |
| 3,969,009 A * | 7/1976 | Radek ...................... | 312/348.6 |
| 4,993,343 A * | 2/1991 | Czipri ......................... | 114/218 |
| 5,134,754 A * | 8/1992 | Vickers ....................... | 16/416 |
| D341,045 S | 11/1993 | Barile | |
| 5,800,229 A | 9/1998 | Peterson | |
| D411,397 S | 6/1999 | Arango | |
| 6,126,235 A * | 10/2000 | Grove .................... | 297/284.7 |
| 6,223,390 B1 | 5/2001 | LoTufo | |
| D474,358 S | 5/2003 | Kita et al. | |
| 6,637,822 B1 * | 10/2003 | Kato .......................... | 297/397 |
| 2002/0145313 A1 | 10/2002 | Alejandro | |

OTHER PUBLICATIONS

Gasser Chair Company, Inc. brochure entitled, "Quick Reference Guide—Quality & Design Standards for Gasser Seating Products," (GB-1/5-84/SC-10M), 1984.
Reprint of p. 8 from a Gasser Chair Company, Inc. catalog entitled "Trademark Collection—Options—Stackable Seating," page heading "Additional Options," copyright 1998, (Catalog code No. GT-OPT-BR/11-98/10M-YL), p. 8.

* cited by examiner

*Primary Examiner*—Milton Nelson, Jr.
(74) *Attorney, Agent, or Firm*—Gifford, Krass, Sprinkle, Anderson & Citkowski, P.C.

(57) ABSTRACT

A seat including a hand grip and a seat back assembly. The seat back assembly has a rigid frame and a trim cover for covering at least a portion of the frame. The hand grip includes an outer surface, an inner surface, a grip area, a flange and a tab. The inner surface is opposite the outer surface. The grip area is defined in the outer surface and is adapted to accommodate a hand of a person. The flange bounds the grip area for concealing a portion or the trim cover during assembly of the hand grip to the seat. The tab extends outwardly from the inner surface of the grip. A distal end of the tab is generally parallel and spaced apart with the inner surface of the hand grip for receiving the frame therebetween.

5 Claims, 3 Drawing Sheets

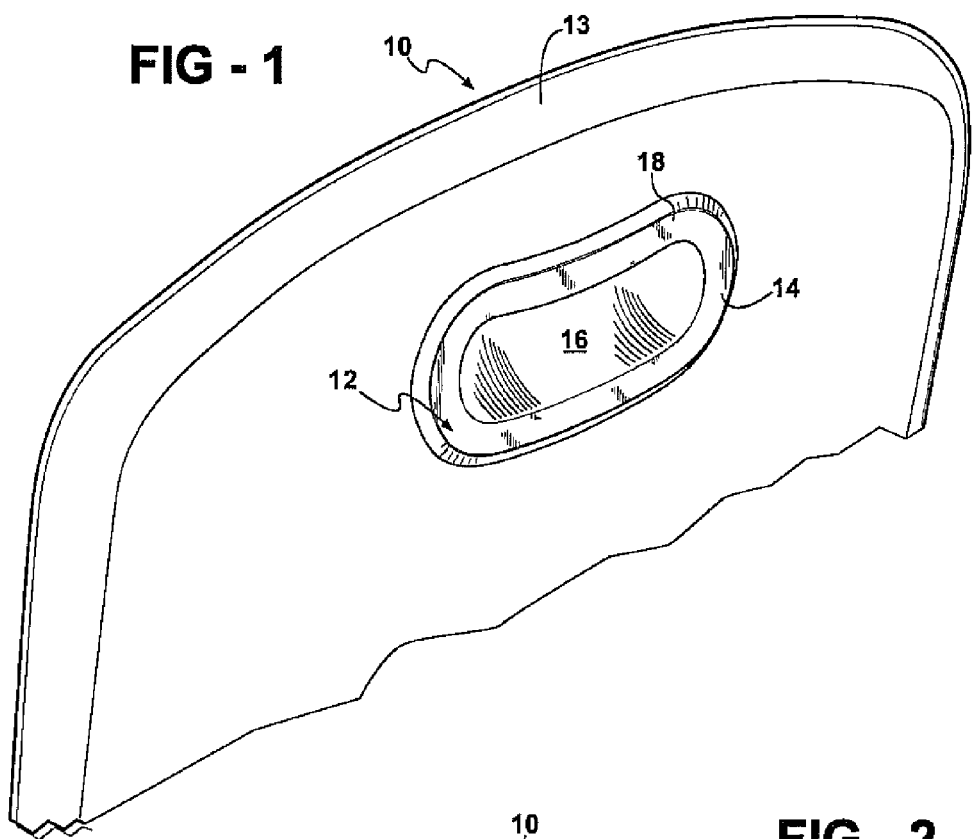
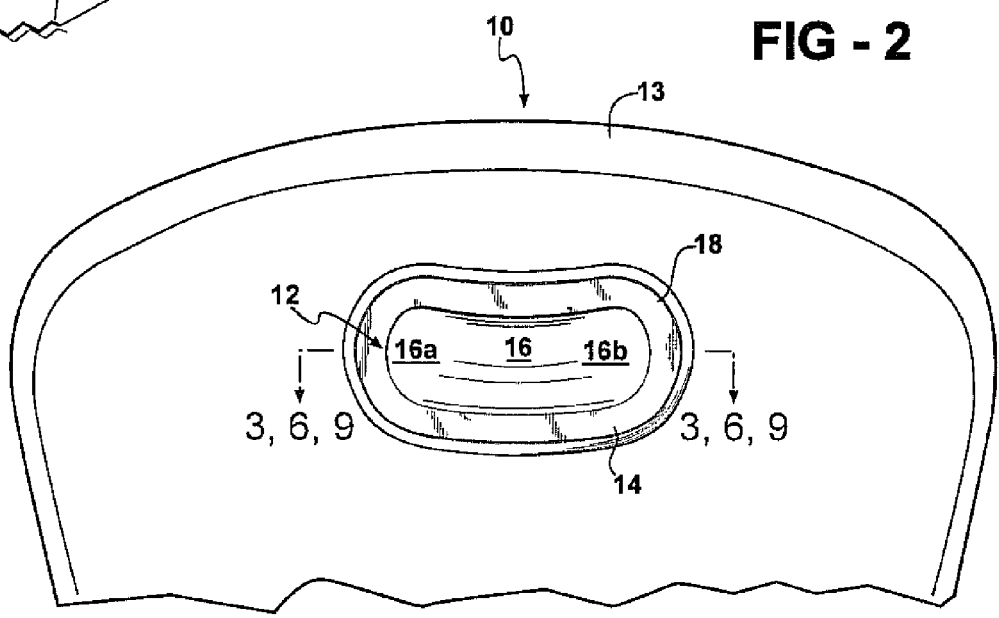

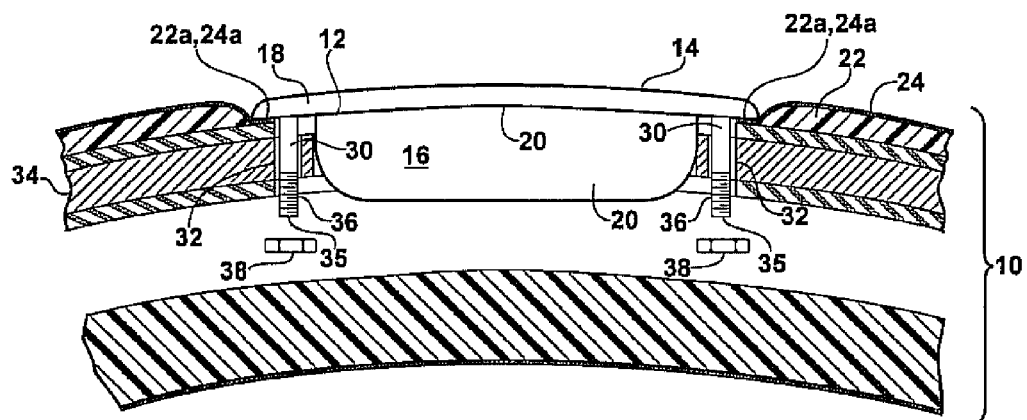
FIG - 3
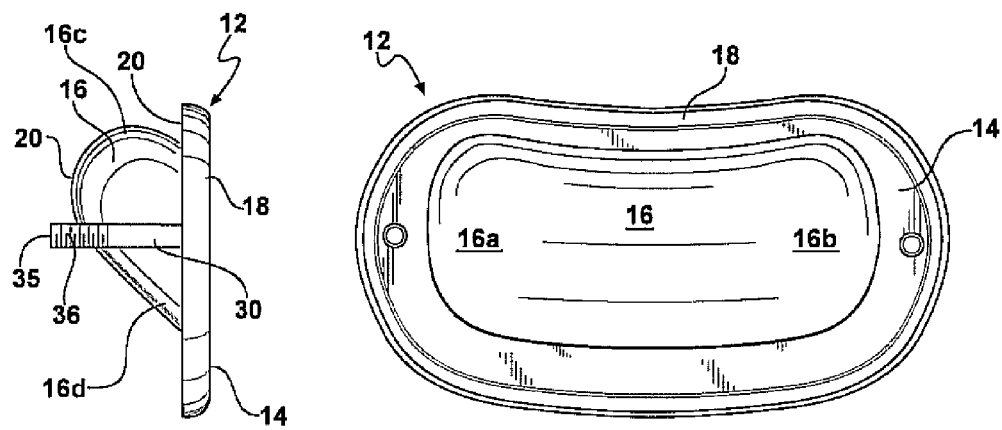
FIG - 4   FIG - 5
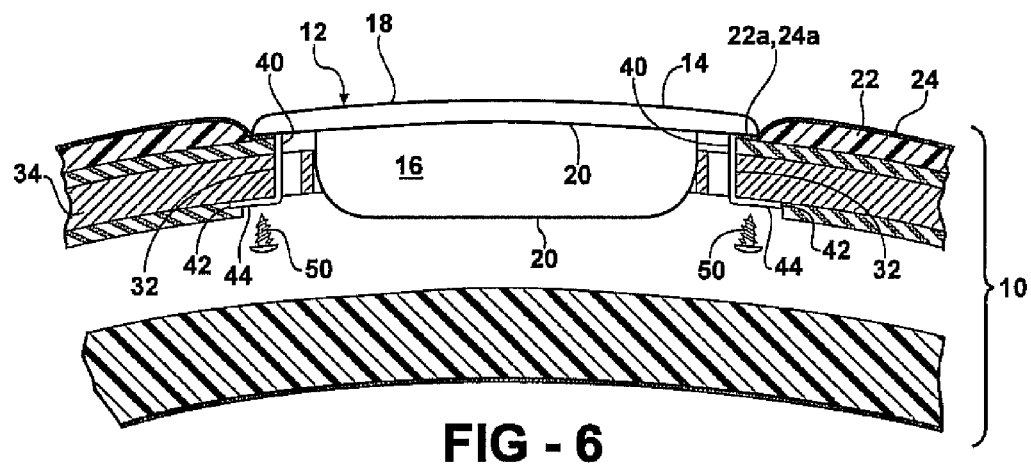
FIG - 6

HAND GRIP FOR A SEAT ASSEMBLY

REFERENCE TO RELATED APPLICATION

This application is a divisional of U.S. patent application Ser. No. 11/118,992, filed Apr. 29, 2005, which claims priority from U.S. Provisional Patent Application Ser. No. 60/566,490, filed Apr. 29, 2004, the contents of which are incorporated herein by reference in their entirety.

FIELD OF THE INVENTION

The invention relates to a hand grip for use with a seat back assembly of a chair. The hand grip facilitates moving of the chair by a person.

BACKGROUND OF THE INVENTION

A chair typically includes a seat back assembly with a rigid frame structure covered by an elastic, cellular foam pad concealed behind a "cut and sew" trim cover. Typically, the frame includes an upper cross member extending between generally upright side members. It is well known to trim the seat back assembly such that a portion of the upper cross member remains exposed to define a handle to facilitate carrying or moving of the chair by a person. It remains desirable to provide a handle that is aesthetically pleasing and, at the same time, provides enhanced functionality over seat handles known in the art.

SUMMARY OF THE INVENTION

According to one aspect of the invention, a hand grip is provided for use with a chair having a seat back assembly with a rigid frame and a trim cover for covering at least a portion of the frame. The hand grip includes an outer surface, an inner surface, a grip area, a flange and a tab. The inner surface is opposite the outer surface. The grip area is defined in the outer surface and is adapted to accommodate a portion of a hand of a person. The flange bounds the grip area for concealing a portion or the trim cover during assembly of the hand grip to the seat back assembly. The tab extends from the inner surface of the grip. In one embodiment, the tab is generally parallel and spaced apart with the inner surface of the hand grip for receiving the frame therebetween.

According to another aspect of the invention, the tab extends outwardly from the inner surface of the grip and is bendable to form an L-shape for retaining the frame between the flange and the tab, thereby securing the hand grip to the seat assembly.

According to another aspect of the invention, a seat assembly includes a seat cushion, a seat back assembly and a hand grip. The seat cushion supports a user in a seated position spaced above a floor. The seat back assembly extends substantially upright with respect to the cushion. The seat back assembly has an upper edge spaced apart from the cushion. The hand grip is fixedly secured to the seat back to facilitate carrying of the seat assembly by a user's hand. The hand grip includes a grip area that is convex to receive fingers of the user therein. The grip area has an upper end space apart by a predetermined distance from the upper edge of the seat back such that the palm of the user's hand rests along the upper edge of the seat back when the fingers of the user's hand are placed along the upper end of the grip area.

BRIEF DESCRIPTION OF THE DRAWINGS

Advantages of the present invention will be readily appreciated as the same becomes better understood by reference to the following detailed description when considered in connection with the accompanying drawings, wherein:

FIG. 1 is a perspective view of a portion of a seat assembly incorporating a one-piece hand grip according to one embodiment of the invention;

FIG. 2 is a rear elevational view of a portion of the seat assembly incorporating the hand grip shown in FIG. 1;

FIG. 3 is a cross sectional view of the seat assembly showing a first embodiment of the attachment of the hand grip to the seat assembly;

FIG. 4 is a side elevational view of the hand grip shown in FIG. 3;

FIG. 5 is a top elevational view of the hand grip shown in FIG. 3;

FIG. 6 is a cross sectional view of the seat assembly showing a second embodiment of the attachment of the hand grip to the seat assembly;

DETAILED DESCRIPTION OF THE INVENTION

Figures 7, 8:
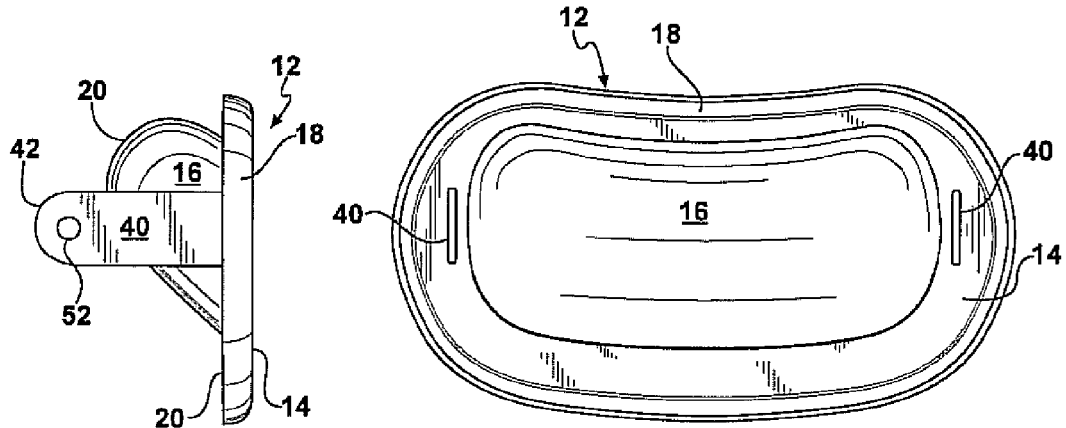
FIG. 7 is a side elevational view of the hand grip shown in FIG. 6.
FIG. 8 is a top elevational view of the hand grip shown in FIG. 6.

Referring to FIGS. 1 and 2, a portion of a back assembly of a chair is generally indicated at 10. The back assembly 10 includes a rigid frame covered, at least in part, by a cellular foam padding concealed behind a trim cover, as commonly known by those of ordinary skill in the art. A bumper 13 is fixedly secured along at least an upper edge of the seat assembly to minimize damage during contact with rigid objects, such as tables, walls, or other seats. A hand grip 12 according to the invention is fixedly secured to the back assembly 10. The hand grip 12 includes an outer surface 14. A grip area 16 is defined in the outer surface 14. The grip area 16 is adapted to receive a hand of a person and is positioned on the back assembly 10 to facilitate carrying or moving of the back assembly 10 or chair by the person. More specifically, the grip area 16 has an elongated ovular shape extending between opposite sides 16a, 16b and oriented transversely across the back assembly 10. The grip area 16 has opposite and spaced apart upper 16c and lower 16d ends extending between the sides 16a, 16b. Preferably, the upper end 16c of the grip area 16 is arcuate and extends outwardly toward the lower end 16d. The grip area 16 is preferably symmetrical about a center axis of the seat, so that the hand grip can be easily held by both left and right hands of the user. The grip area 16 is substantially bounded by a rim or flange 18. The grip area 16 defines a receiving portion that is concave relative to the flange 18 and extends upwardly relative to the upper end 16c for receiving the fingers of a user therethrough.

In FIGS. 3-11, several embodiments of the invention are shown which illustrate how the hand grip 12 is fixedly secured to the back assembly 10. Preferably, the hand grip 12 is mounted to a seat back portion of the seat assembly, as shown in the figures. Most preferably, the hand grip 12 is spaced apart from the bumper 13 by a predetermined distance, such that the palm of the user's hand rests along the bumper 13 when the fingers are inserted into the grip area 16. However, it should be readily appreciated that the hand grip 12 can be mounted to any portion of the back assembly 10.

Referring to FIGS. 3-5, the hand grip 12 includes an inner surface 20. The inner surface 20 is generally parallel with the outer surface 14, such that the grip area 16 is represented in the inner surface 20 as convex relative to the flange 18. Corresponding holes are formed in the foam 22 and trim cover 24 for receiving the grip area 16 therethrough. Edges 22a, 24a of the foam 22 and trim cover 24 define the holes and about the grip area 16. The flange 18 extends outwardly from the grip area 16 to conceal the edges 22a, 24a of the foam 22 and trim cover 24.

A stem 30 extends outwardly from the inner surface of the flange 18. The stem 30 extends axially through a corresponding hole 32 formed in the frame 34 so that a distal end 35 of the stem 30 protrudes from an opposite side of the frame 34 relative to the flange 18. A portion 36 of the stem 30 adjacent the distal end 35 is threaded. A nut 38 is threaded onto the threaded portion 36 causing the flange 18 to be pulled against the trim cover 24. The flange 18 is pressed into the foam 22 so that the outer surface of the flange 18 is generally flush with the trim cover 24 to provide an aesthetically pleasing appearance. A boss can be formed to extend outwardly from the inner surface 20 to positively locate the hand grip 12 relative to the frame 34 as the nut 38 is threaded onto the stem 30. Preferably, at least two stems 30 are utilized to fixedly secure the hand grip 12 to the back assembly 10.

Referring to FIGS. 6-8, a second embodiment of the attachment of the hand grip 12 to the back assembly 10 is shown. A bendable tab 40 extends outwardly from the inner surface 20. The tab 40 extends through the hole 32 formed in the frame 34 so that a distal end 42 of the tab 40 protrudes from an opposite side of the frame 34 relative to the flange 18. A portion of the tab 40 adjacent the distal end 42 of the tab 40 is deformed to define a bend 44 so that the tab 40 is generally L-shaped. The trim cover 24, foam 22 and frame 34 are retained between the bend 44 and the flange 18. A screw 50 is fed through a hole 52 formed in the bend 44 and threadingly engaged with a corresponding hole 54 formed in the frame 34 to fixedly secure the hand grip 12 to the back assembly 10. The hole 52 is best shown in FIG. 7, which illustrates the tab 40 prior to bending. Preferably, a plurality of tabs 40 are utilized to fixedly secure the hand grip 12 to the back assembly 10. The tabs 40 can be formed from metal and insert molded during formation of the hand grip 12.

Alternatively, the bend 44 is pre-formed on the tab 40 prior to assembly with the back assembly 10. During assembly, the tab 40 and hand grip 12 are elastically deformed to allow the bend 44 to be placed on opposite sides of the frame 34 relative to the flange 18. Then, the screw 50 is driven through the holes 52 to secure the hand grip 12 to the back assembly 10.

Figure 9:
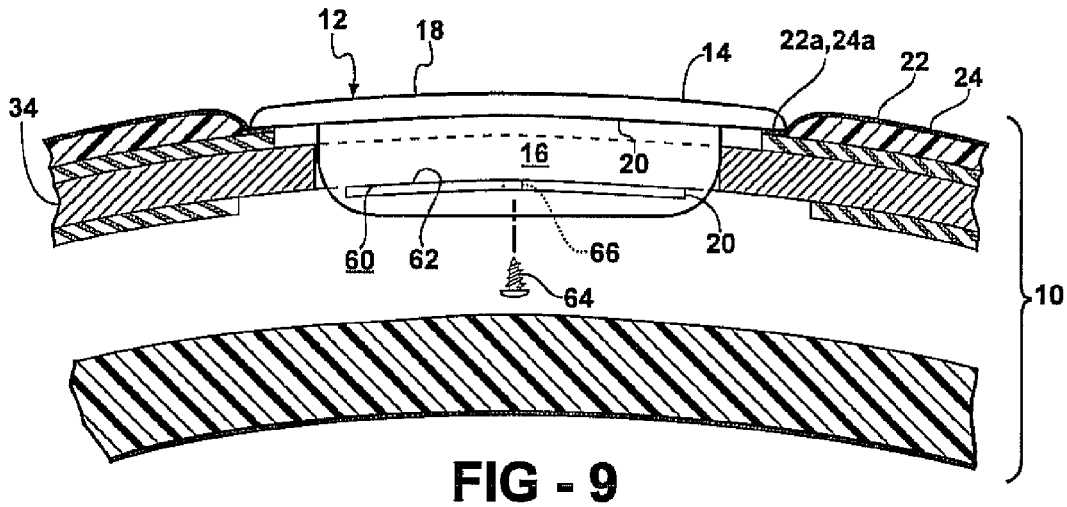
FIG. 9 is a cross sectional view of the seat assembly illustrating a third embodiment of the attachment of the hand grip to the seat assembly.
Figures 10, 11:
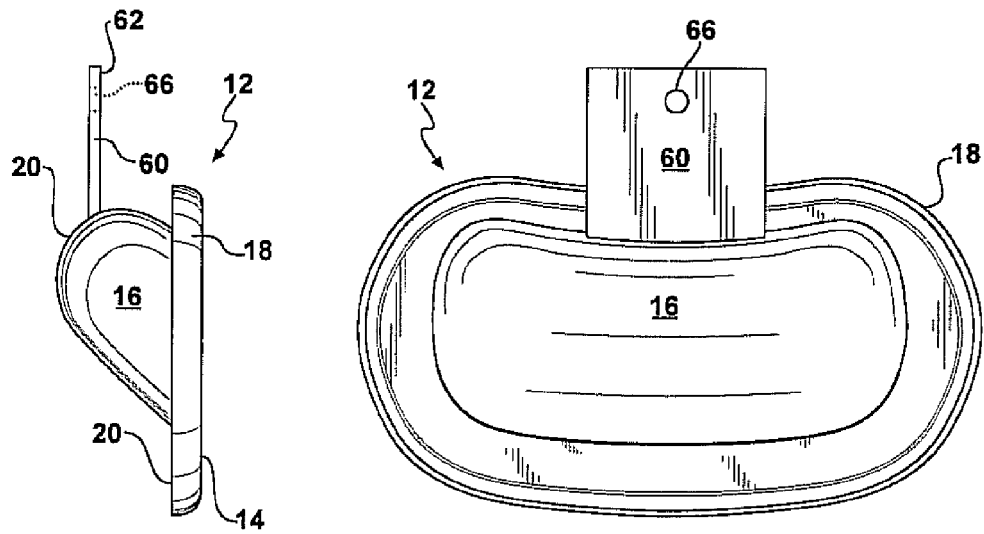
FIG. 10 is a side elevational view of the hand grip shown in FIG. 9.
FIG. 11 is a top elevational view of the hand grip shown in FIG. 9.

Referring to FIGS. 9-11, a third embodiment of the attachment of the hand grip 12 to the back assembly 10 is shown. A bracket 60 extends outwardly from the inner surface 20 to present an abutment surface 62 that is generally parallel and spaced apart from the inner surface of the flange 18. In assembly, the bracket 60 and the flange 18 are placed on opposite sides of the frame 34. More specifically, the trim cover 24, foam 22 and frame 34 are retained between the abutment surface 62 and the flange 18. A screw 64 is fed through a hole 66 formed in the bracket 60 and threadingly engaged with a corresponding hole (not shown) in the frame 34 to fixedly secure the hand grip 12 to the back assembly 10. It should be appreciated that any number of screws 64 can be utilized to fixedly secure the hand grip 12 to the back assembly 10. The bracket 60 can be made from metal and insert molded during formation of the hand grip 12. Alternatively, the bracket 60 is plastic and is integrally formed with the hand grip 12 during formation thereof.

Preferably, the hand grip 12 is formed from plastic using conventional forming processes, such as injection molding, or may be partially or completely formed in metal. However, it should be appreciated that the grip can be made from any material using any manufacturing process known by those having ordinary skill in the art.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A seat assembly comprising:
a cushion for supporting a user in a seated position spaced above a floor;
a seat back having a frame secured to the cushion for supporting the seat back in a substantially upright position relative to the cushion, the seat back having an upper edge spaced apart from the cushion; and
a hand grip fixedly secured to the seat back to facilitate carrying of the seat assembly by a user's hand, the hand grip comprising:
a hand grip body having a flange disposed against an outer surface of the seat back, the flange defining an outer surface of the hand grip body and surrounding a finger receiving outer opening, the hand grip body further having a grip area extending from the outer opening to a closed back end, the grip area extending transversely between a pair of opposite sides, the closed back end being generally raised with respect to the outer opening such that the grip area extends inwardly and upwardly with respect to the outer opening, the outer opening of the hand grip body having an upper edge and a lower edge, the upper edge having a central area and a pair of outboard sides, the central area being lower than the outboard sides such that the upper edge extends generally arcuately downwardly from one of the outboard sides to the central region and generally arcuately upwardly from the central region to the other of the outboard sides;
a tab extending from the hand grip body and having an outward end spaced from the flange of the hand grip body, a portion of the seat back frame being disposed in the space between the outward end of the tab and the flange; and
a fastener securing the portion of the seat back frame to the tab.

2. The seat assembly as set forth in claim 1, wherein the tab is bendable to form an L-shape for retaining the frame between the flange and the tab, thereby securing the hand grip to the seat assembly.

3. The seat assembly as set forth in claim 1, wherein the tab extends from an inner surface of the grip body, the tab being generally parallel with and spaced apart from the flange for retaining a portion of the frame between the flange and the tab.

4. The seat assembly as set forth in claim 1, wherein the grip area has an elongated ovular shape extending between the opposite sides.

5. The seat assembly according to claim 1, wherein the tab is generally planar and extends from the grip body, the tab being generally parallel with the flange.

* * * * *